US009245467B2

(12) United States Patent
Choi et al.

(10) Patent No.: US 9,245,467 B2
(45) Date of Patent: Jan. 26, 2016

(54) STEREOSCOPIC DISPLAY DEVICE, IMAGE PROCESSING DEVICE AND IMAGE PROCESSING METHOD

(71) Applicant: SAMSUNG DISPLAY CO., LTD., Yongin, Gyeonggi-do (KR)

(72) Inventors: Byeong-Hwa Choi, Yongin (KR); Sueng-Bae Lee, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 1 day.

(21) Appl. No.: 14/044,483

(22) Filed: Oct. 2, 2013

(65) Prior Publication Data

US 2014/0354702 A1  Dec. 4, 2014

(30) Foreign Application Priority Data

May 28, 2013  (KR) .......................... 10-2013-0060472

(51) Int. Cl.
| | |
|---|---|
| G09G 5/10 | (2006.01) |
| G06T 15/50 | (2011.01) |
| G09G 3/00 | (2006.01) |
| G09G 3/20 | (2006.01) |
| H04N 13/00 | (2006.01) |
| H04N 13/04 | (2006.01) |

(52) U.S. Cl.
CPC ............... *G09G 3/003* (2013.01); *G09G 3/20* (2013.01); *H04N 13/0007* (2013.01); *H04N 13/0497* (2013.01); *G09G 2360/16* (2013.01); *H04N 2013/0081* (2013.01)

(58) Field of Classification Search
CPC ........... H04N 13/00–13/0456; H04N 13/0497; H04N 2013/0081; G09G 2320/0209; G09G 3/003; G09G 3/20; G09G 2360/16; G06T 2207/10021

USPC .................... 345/156–184; 178/18.01–20.04
See application file for complete search history.

(56) References Cited

U.S. PATENT DOCUMENTS

| | | | |
|---|---|---|---|
| 6,559,813 B1 * | 5/2003 | DeLuca et al. ..................... 345/8 |
| 2008/0013139 A1 * | 1/2008 | Maruyama et al. ............. 359/23 |
| 2011/0157332 A1 * | 6/2011 | Kim et al. ......................... 348/56 |
| 2012/0256903 A1 * | 10/2012 | Kim ................... H04N 13/0497 |
| | | | 345/419 |
| 2013/0021334 A1 * | 1/2013 | Lee et al. ....................... 345/419 |
| 2013/0106836 A1 * | 5/2013 | Kim et al. ...................... 345/419 |
| 2013/0114043 A1 * | 5/2013 | Balan et al. .................... 351/210 |

(Continued)

FOREIGN PATENT DOCUMENTS

| | | |
|---|---|---|
| KR | 10-2008-0002394 | 1/2008 |
| KR | 10-2010-0064859 | 6/2010 |

(Continued)

*Primary Examiner* — Lun-Yi Lao
*Assistant Examiner* — Elliott Deaderick
(74) *Attorney, Agent, or Firm* — F. Chau & Associates, LLC (57) ABSTRACT

A stereoscopic display device includes a display unit. The display unit includes a plurality of pixels. A scan driving unit sequentially applies scan signals through a plurality of scan lines to the plurality of pixels. A data driving unit applies gray voltages through a plurality of data lines to the plurality of pixels in response to the scan signals. A signal controlling unit transfers a data control signal and an image data signal to the data driving unit. The signal controlling unit classifies, in accordance with a disparity of objects respectively included in a left-eye image and a right-eye image, an object depth in which an object is recognized by a user. The signal controlling unit resets a luminance of at least one of the left-eye image or the right-eye image corresponding to the object depth.

24 Claims, 4 Drawing Sheets

(56) References Cited

U.S. PATENT DOCUMENTS

2013/0176393 A1* 7/2013 Onishi .................. G09G 3/003
  348/43
2014/0198104 A1* 7/2014 Tanaka ................ H04N 13/026
  345/426

FOREIGN PATENT DOCUMENTS

| KR | 10-2011-0074381 | 6/2011 |
| KR | 10-2012-0073457 | 7/2012 |

* cited by examiner

STEREOSCOPIC DISPLAY DEVICE, IMAGE PROCESSING DEVICE AND IMAGE PROCESSING METHOD

CROSS-REFERENCE TO RELATED APPLICATION

This application claims priority to Korean Patent Application No. 10-2013-0060472 filed in the Korean Intellectual Property Office on May 28, 2013, the disclosure of which is incorporated by reference herein in its entirety.

TECHNICAL FIELD

Exemplary embodiments of the present invention relate to displays, and more specifically, to a stereoscopic display device, an image processing device, and an image processing method.

DISCUSSION OF THE RELATED ART 3-dimensional (3D) displays that may implement stereoscopic images generally consume more electric power than 2-dimensional (2D) displays. Accordingly, research for reducing the power consumption of a stereoscopic display is underway.

SUMMARY

An exemplary embodiment of the present invention provides a stereoscopic display device. The stereoscopic display device includes a display unit. The display unit includes a plurality of pixels. A scan driving unit sequentially applies scan signals to a plurality of scan lines connected to the plurality of pixels. A data driving unit applies gray voltages to a plurality of data lines connected to the plurality of pixels in response to the scan signals. A signal controlling unit transfers a data control signal and an image data signal to the data driving unit. The signal controlling unit classifies, in accordance with a disparity of objects respectively included in a left-eye image and a right-eye image, an object depth in which an object is recognized by a user. The signal controlling unit resets a luminance of at least one of the left-eye image or the right-eye image corresponding to the object depth to generate the image data signal.

The signal controlling unit may gradually decrease the luminance of the recognized object as the object depth from the user increases.

The signal controlling unit may classify the object depth into a front object depth in which the recognized object appears projected towards the user from the display unit, a zero object depth in which the recognized object appears positioned on the display unit, and a rear object depth in which the recognized object appears positioned at an opposite side of the user with respect to the display unit.

The signal controlling unit may maintain a luminance of a first object corresponding to the front object depth, make a luminance of a second object corresponding to the zero object depth lower than the luminance of the first object, and make a luminance of a third object corresponding to the rear object depth lower than the luminance of the second object.

The front object depth may include a first front object depth in which the recognized object is relatively closer to the user and a second front object depth in which the recognized object is relatively closer to the display unit. The rear object depth includes a first rear object depth in which the recognized object is relatively closer to the display unit and a second rear object depth in which the recognized object is relatively farther from the display unit.

The signal controlling unit may maintain the luminance of the first object corresponding to the first front object depth, make the luminance of the second object corresponding to the second front object depth lower than the luminance of the first object, make the luminance of the third object corresponding to the zero object depth lower than the luminance of the second object, make luminance of a fourth object corresponding to the first rear object depth lower than the luminance of the third object, and make luminance of a fifth object corresponding to the second rear object depth lower than the luminance of the fourth object to generate the image data signal.

The signal controlling unit may maintain the luminance of the second object corresponding to the second front object depth, make the luminance of the first object corresponding to the second front object depth higher than the luminance of the second object, make the luminance of the third object corresponding to the zero object depth lower than the luminance of the second object, make the luminance of the fourth object corresponding to the first rear object depth lower than the luminance of the third object, and make the luminance of the fifth object corresponding to the second rear object depth lower than the luminance of the fourth object.

An exemplary embodiment of the present invention provides an image processing device. The image processing device includes a disparity classifying unit. The disparity classifying unit classifies, in accordance with a disparity of objects respectively included in left-eye image and a right-eye image, an object depth in which an object is recognized by a user. A luminance resetting unit resets a luminance of at least one of the left-eye image or the right-eye image by gradually decreasing the luminance of the recognized object as the object depth from the user increases.

The disparity classifying unit may classify the object depth into a front object depth in which the recognized object appears projected towards the user side from the display unit, a zero object depth in which the recognized object appears positioned on the display unit, and a rear object depth in which the recognized object appears positioned at an opposite side of the user with respect to the display unit.

The front object depth may include a first front object depth in which the recognized object is relatively closer to the user and a second front object depth in which the recognized object is relatively closer to the display unit. The rear object depth includes a first rear object depth in which the recognized object is relatively closer to the display unit and a second rear object depth in which the recognized object is relatively farther from the display unit.

The luminance resetting unit may maintain the luminance of the first object corresponding to the first front object depth, make the luminance of the second object corresponding to the second front object depth lower than the luminance of the first object, make the luminance of the third object corresponding to the zero object depth lower than the luminance of the second object, make luminance of a fourth object corresponding to the first rear object depth lower than the luminance of the third object, and make luminance of a fifth object corresponding to the second rear object depth lower than the luminance of the fourth object.

The luminance resetting unit may maintain the luminance of the second object corresponding to the second front object depth, make the luminance of the first object corresponding to the first front object depth higher than the luminance of the second object, make the luminance of the third object corresponding to the zero object depth lower than the luminance of the second object, make the luminance of the fourth object corresponding to the first rear object depth lower than the luminance of the third object, and make the luminance of the fifth object corresponding to the second rear object depth lower than the luminance of the fourth object.

The image processing device may further include a disparity analyzing unit. The disparity analyzing unit analyzes the disparity of the objects respectively included in the left-eye image and the right-eye image.

An exemplary embodiment of the present invention provides an image processing method. The image processing method includes analyzing a disparity of objects respectively included in a left-eye image and a right-eye image. An object depth in which an object is recognized by a user is classified in accordance with the disparity of the objects respectively included in the left-eye image and the right-eye image. A luminance of at least one of the left-eye image or the right-eye image is reset by gradually decreasing the luminance of the object as the object depth from the user increases.

The object depth may be classified into a front object depth in which the recognized object appears projected towards the user side from the display unit, a zero object depth in which the recognized object appears positioned on the display unit, and a rear object depth in which the recognized object appears positioned at an opposite side of the user with respect to the display unit.

The front object depth may be classified into a first front object depth in which the recognized object is relatively closer to the user side and a second front object depth in which the recognized object is relatively closer to the display unit. The rear object depth may be classified into a first rear object depth in which the recognized object is relatively closer to the display unit and a second rear object depth in which the recognized object is relatively farther from the display unit.

A luminance of a first object corresponding to the first front object depth may be maintained. A luminance of a second object corresponding to the second front object depth may be made lower than the luminance of the first object. A luminance of a third object corresponding to the zero object depth may be made lower than the luminance of the second object. A luminance of a fourth object corresponding to the first rear object depth may be made lower than the luminance of the third object. A luminance of a fifth object corresponding to the second rear object depth may be made lower than the luminance of the fourth object.

The luminance of the second object corresponding to the second front object depth may be maintained. The luminance of the first object corresponding to the first front object depth may be made higher than the luminance of the second object. The luminance of the third object corresponding to the zero object depth may be made lower than the luminance of the second object. The luminance of the fourth object corresponding to the first rear object depth may be made lower than the luminance of the third object. The luminance of the fifth object corresponding to the second rear object depth may be made lower than the luminance of the fourth object.

An exemplary embodiment of the present invention provides an image processing method. The image processing method includes acquiring a difference value between a position of an object included in a left-eye image and a position of an object included in a right-eye image. A luminance of an object recognized by a user is maintained when the difference value is a positive value. The luminance of the recognized object is decreased when the difference value is a negative value.

The luminance of the recognized object is maintained when the difference value is equal to or more than a first positive threshold value. The luminance of the recognized object is decreased by a first level when the difference value is a value between the first threshold value and 0.

The luminance of the recognized object is decreased by a second level more than the first level when the difference value is 0.

The luminance of the recognized object is decreased by a third level more than the second level when the difference value is a value between 0 and a second negative threshold value. The luminance of the recognized object is decreased by a fourth level more than the third level when the difference value is equal to or less than the second threshold value.

The luminance of the recognized object is maintained when the difference value is a value between the first threshold value and 0. The luminance of the recognized object is increased when the difference value is equal to or more than the first positive threshold value.

According to an exemplary embodiment of the present invention, a display device comprises a display unit configured to display a left-eye image and a right-eye image. The display unit includes a plurality of pixels. A data driving unit is configured to apply gray voltages through a plurality of data lines to the plurality of pixels in response to an image data signal. A signal controlling unit is configured to determine an object depth in which an object is recognized by a user in accordance with a disparity of objects respectively included in a left-eye image and a right-eye image. The signal controlling unit is configured generate the image data signal so a luminance of the recognized object is reduced as the object depth increases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Hereinafter, exemplary embodiments of the present invention will be described in detail with reference to the accompanying drawings such that those skilled in the art can easily implement the embodiments. However, the present invention may be embodied in various different forms and should not be construed as limited to the exemplary embodiments set forth herein.

Like reference numerals may refer to like or similar elements throughout the specification and the drawings.

It will be understood that when an element or layer is referred to as being "on," "connected to," "coupled to," or "adjacent to" another element or layer, it can be directly on, connected, coupled, or adjacent to the other element or layer, or intervening elements or layers may be present.

As used herein, the singular forms "a," "an," and "the" are intended to include the plural forms as well, unless the context clearly indicates otherwise.

Figure 1:
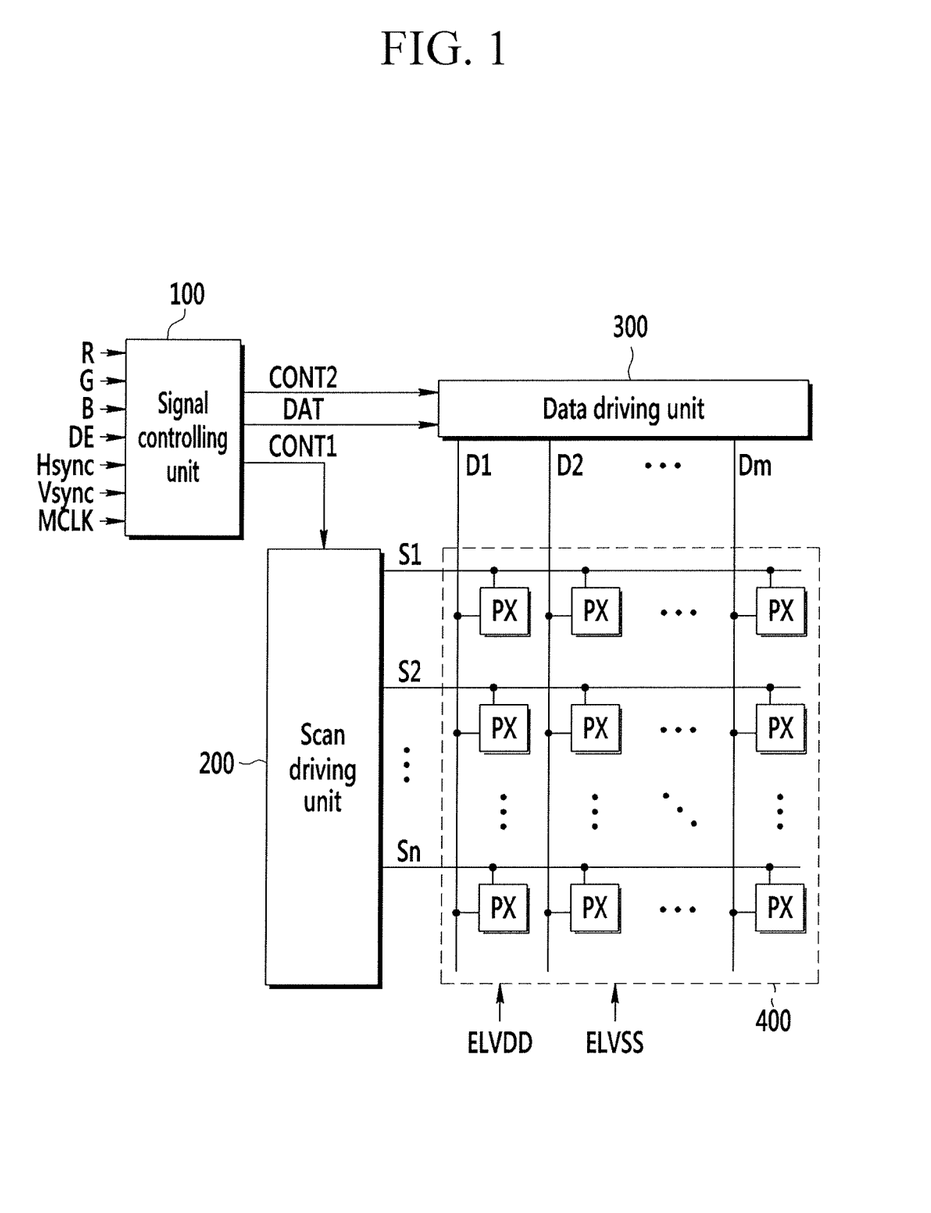
FIG. 1 is a block diagram illustrating a display device according to an exemplary embodiment of the present invention.

FIG. 1 is a block diagram illustrating a display device according to an exemplary embodiment of the present invention.

Referring to FIG. 1, the display device includes a signal controlling unit 100, a scan driving unit 200, a data driving unit 300, and a display unit 400.

The signal controlling unit 100 receives image signals R, G, and B from an external device and an input control signal for controlling displaying the image signals R, G, and B. The image signals R, G, and B contain information on the luminance of each pixel PX. The luminance has a predetermined number of grays, for example, 1024 ($=2^{10}$), 256 ($=2^8$), or 64 ($2^6$) grays. Examples of the input control signal include a data enable signal DE, a horizontal synchronization signal Hsync, a vertical synchronization signal Vsync, a main clock MCLK, and the like.

The signal controlling unit 100 processes the image signals R, G, and B according to operating conditions of the display unit 400 and the data driving unit 300 based on the image signals R, G, and B and the input control signal, and the signal controlling unit 100 generates a scan control signal CONT1, a data control signal CONT2, and an image data signal DAT. The signal controlling unit 100 transfers the scan control signal CONT1 to the scan driving unit 200. The signal controlling unit 100 transfers the data control signal CONT2 and the image data signal DAT to the data driving unit 300.

The display unit 400 includes a plurality of scan lines S1 to Sn, a plurality of data lines DP2 to Dm, and a plurality of pixels PX. The plurality of scan lines S1 to Sn extends substantially in a row direction of the display unit 400. The plurality of scan lines. S1 to Sn are substantially parallel to each other. The plurality of data lines D1 to Dm extends substantially in a column direction of the display unit 400. The plurality of data lines D1 to Dm are substantially parallel to each other. The plurality of pixels PX is arranged substantially in a matrix pattern. The plurality of pixels PX are connected to the plurality of scan lines S1 to Sn and the plurality of data lines D1 to Dm. The plurality of pixels PX receives a first power voltage ELVDD and a second power voltage ELVSS.

The scan driving unit 200 is connected to the plurality of scan lines S1 to Sn, and the scan driving unit 200 applies scan signals formed by combining a gate-on voltage with a gate-off voltage to the plurality of scan lines S1 to Sn according to the scan control signal CONT1.

The data driving unit 300 is connected to the plurality of data lines D1 to Dm, and the data driving unit 300 selects gray voltages depending on the image data signal DAT. The data driving unit 300 applies the selected gray voltages to the plurality of data lines D1 to Dm as data signals according to the data control signal CONT2.

When the display device is a stereoscopic display device, the image signals R, G, and B input into the signal controlling unit 100 include left-eye image signals for a left-eye image and right-eye image signals for a right-eye image. The signal controlling unit 100 may analyze a disparity of objects included in the left-eye image and the right-eye image by using the left-eye image signals and the right-eye image signals.

As used herein, the "disparity" refers to a difference between the position of an object in the left-eye image and the position of the object in the right-eye image, for example, a difference between the coordinate of the object in the left-eye image and the coordinate of the object in the right-eye image.

The signal controlling unit 100 may classify an object depth in which the object is recognized by a user according to the disparity of the object and generate the image data signal DAT by gradually decreasing the luminance of the object as the object depth from the user increases. The object depth means a distance in which the object is recognized by the user.

For example, the signal controlling unit 100 may classify the object depth into a front object depth in which the object appears projected towards the user from the display unit 400, a zero object depth in which the object appears positioned on the display unit 400, and a rear object depth in which the object appears positioned at an opposite side of the user with respect to the display unit 400. In this case, the signal controlling unit 100 maintains a luminance of a first object corresponding to the front object depth in the left-eye image and the right-eye image, makes a luminance of a second object corresponding to the zero object depth lower than the luminance of the first object, and makes a luminance of a third object corresponding to the rear object depth lower than the luminance of the second object to generate the image data signal DAT.

The signal controlling unit 100 may classify the front object depth into a first front object depth in which the recognized object is relatively closer to the user and a second front object depth in which the recognized object is relatively closer to the display unit 400. The signal controlling unit 100 may classify a first rear object depth in which the recognized object is relatively closer to the display unit 400 and a second rear depth object relatively more distant from the display unit 400.

The signal controlling unit 100 maintains the luminance of the first object corresponding to the first front object depth in the left-eye image and the right-eye image, makes the luminance of the second object corresponding to the second front object depth lower than the luminance of the first object, makes the luminance of the third object corresponding to the zero object depth lower than the luminance of the second object, makes a luminance of a fourth object corresponding to the first rear object depth lower than the luminance of the third object, and makes a luminance of a fifth object corresponding to the second rear object depth lower than the luminance of the fourth object, thus generating the image data signal DAT.

Alternatively, the signal controlling unit 100 maintains the luminance of the second object corresponding to the second front object depth in the left-eye image and the right-eye image, makes the luminance of the first object corresponding to the first front object depth higher than the luminance of the first object, makes the luminance of the third object corresponding to the zero object depth lower than the luminance of the second object, makes the luminance of the fourth object corresponding to the first rear object depth lower than the luminance of the third object, and makes the luminance of the fifth object corresponding to the second rear object depth lower than the luminance of the fourth object, thus generating the image data signal DAT.

The driving units 100, 200, and 300 may be mounted outside a pixel area in at least one integrated circuit. The driving units 100, 200, and 300 may be mounted on a flexible printed circuit film. The driving units 100, 200, and 300 may be attached to the display unit 400 in a tape carrier package (TCP). The driving units 100, 200, and 300 may be mounted on an additional printed circuit board. The driving units 100, 200, and 300 may be integrated outside the pixel area together with the scan lines S1 to Sn and the data line D1 to Dm.

Classifying the object depth according to the disparity of the objects respectively included in the left-eye image and the right-eye image and resetting the luminances of the left-eye image and the right-eye image corresponding to the object depth may be performed by an image processing device (e.g., element 110 of FIG. 2) provided in or outside the signal controlling unit 100.

Figure 2:
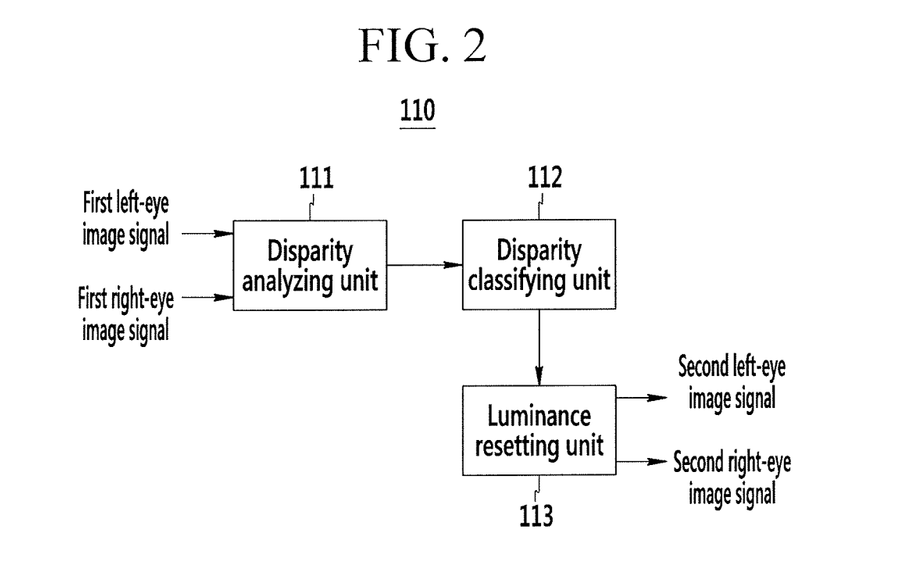
FIG. 2 is a block diagram illustrating an image processing device according to an exemplary embodiment of the present invention.
Figure 3:
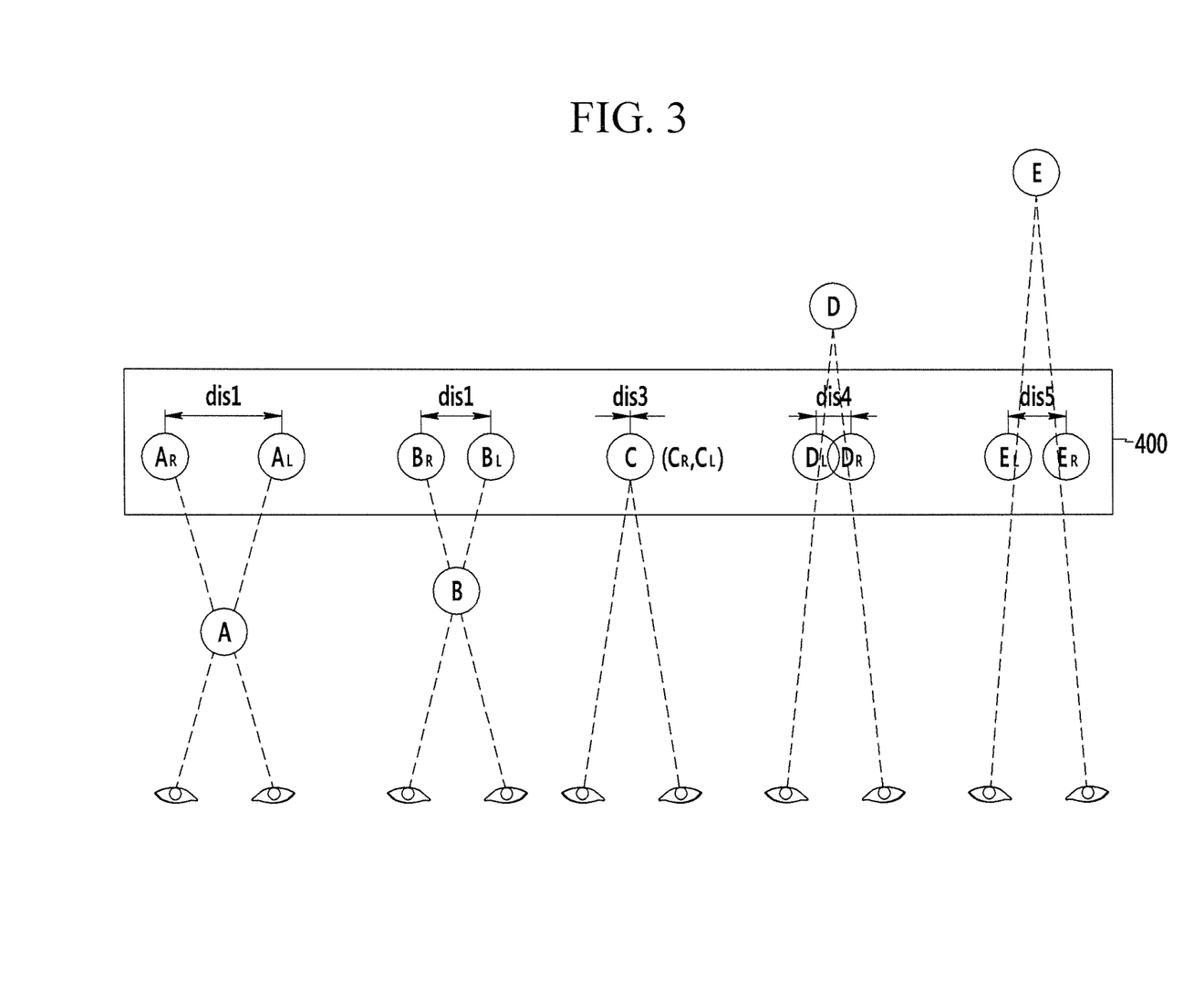
FIG. 3 is an exemplary diagram illustrating a method of analyzing a disparity of objects respectively included in a left-eye image and a right-eye image according to an exemplary embodiment of the present invention.
Figure 4:
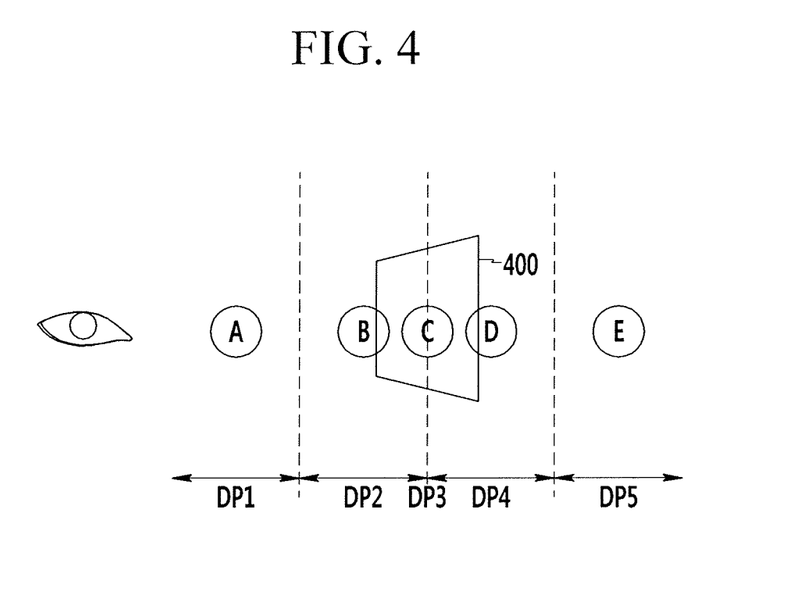
FIG. 4 is an exemplary diagram illustrating a method of classifying an object depth in which an object is recognized depending on a disparity of objects respectively included in a left-eye image and a right-eye image according to an exemplary embodiment of the present invention.
Figure 5:
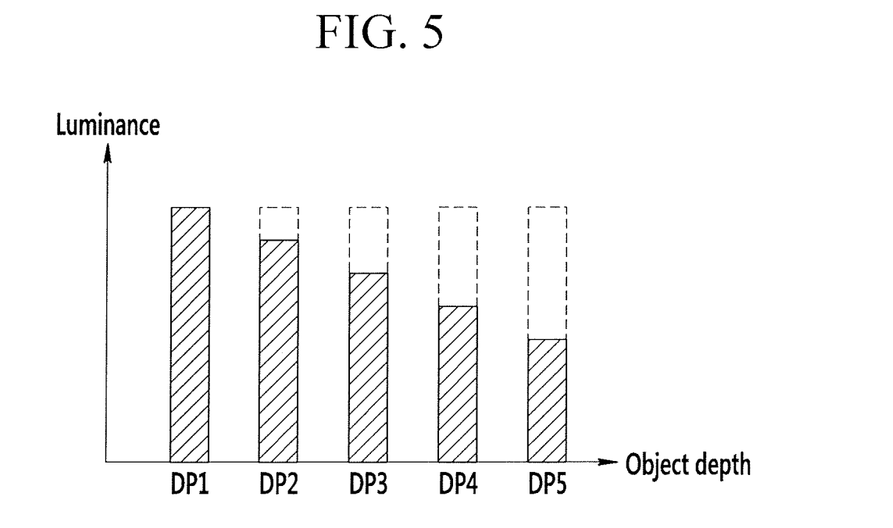
FIG. 5 is an exemplary diagram illustrating a method of resetting luminances of a left-eye image and a right-eye image correspond to an object depth according to an exemplary embodiment of the present invention.

FIG. 2 is a block diagram illustrating an image processing device according to an exemplary embodiment of the present invention. FIG. 3 is a diagram illustrating a method of analyzing a disparity of objects included in a left-eye image and a right-eye image according to an exemplary embodiment of the present invention. FIG. 4 is a diagram illustrating a method of classifying an object depth in which an object is recognized depending on a disparity of objects which are included in a left-eye image and a right-eye image according to an exemplary embodiment of the present invention. FIG. 5 is a diagram illustrating a method of resetting luminances of a left-eye image and a right-eye image corresponding to an object depth according to an exemplary embodiment of the present invention.

Referring to FIG. 2, the image processing device 110 includes a disparity analyzing unit 111, a disparity classifying unit 112, and a luminance resetting unit 113.

The disparity analyzing unit 111 receives a first left-eye image signal for a left-eye image and a first right-eye image signal for a right-eye image from an external device and analyzes the disparity of the objects included in the left-eye image and the right-eye image. The left-eye image is formed by the first left-eye image signal, and the right-eye image is formed by the first right-eye image signal. The disparity analyzing unit 111 may analyze the disparity by using a stereo matching technique.

For example, the disparity analyzing unit 111 determines one of the left-eye image and the right-eye image as a reference image and determines the other one as a search image. The disparity analyzing unit 111 sets a first window (which is also referred to as a "reference pixel window") having a predetermined size based on a reference pixel of the reference image and sets a second window (which is also referred to as a "second pixel window") having the same size as the first window based on a search pixel of the search image. The reference pixel means a pixel with a corresponding pixel in the search image, which needs to be verified, among pixels of the reference image. The search pixel means a corresponding pixel of the reference pixel among pixels of the search image. The window may have a matrix pattern that includes a center pixel and neighboring pixels surrounding the center pixel. The disparity analyzing unit 111 calculates similarities between pixels in a reference pixel window and pixels in each of search pixel windows, determines a search pixel of a search pixel window having a largest similarity to the reference pixel window among the search pixel windows as a corresponding pixel. The disparity analyzing unit 111 acquires a distance between the reference pixel and the corresponding pixel, for example, a difference value in position between the reference pixel and the corresponding pixel, as the disparity.

When the left-eye image is determined as the reference image and the right-eye image is determined as the search image, a plurality of reference pixels forms the object included in the left-eye image and a plurality of corresponding pixels forms the object included in the right-eye image. The disparity analyzing unit 111 may acquire a difference value between the position of the object included in the left-eye image and the position of the object included in the right-eye image, and acquire the difference value as a disparity of the objects.

For purposes of description, the left-eye image is the reference image, and the right-eye image is the search image. A right direction of a screen is a positive direction when a user views the screen.

Referring to FIG. 3, a first object $A_L$ included in the left-eye image and a first object $A_R$ included in the right-eye image allow the user to recognize a first object A. The first object $A_L$ included in the left-eye image and the first object $A_R$ included in the right-eye image are spaced apart from each other by a first position difference value dis1. Since the right direction of the screen is the positive direction, the first position difference value dis1 acquired by subtracting the position of the first object $A_R$ included in the right-eye image from the position of the first object $A_L$ included in the left-eye image is a positive value.

A second object $B_L$ included in the left-eye image and a second object $B_R$ included in the right-eye image allow the user to recognize a second object B. The second object $B_L$ included in the left-eye image and the second object $B_R$ included in the right-eye image are spaced apart from each other by a second position difference value dis2. Since the right direction of the screen is the positive direction, the second position difference value dis2 acquired by subtracting the position of the second object $B_R$ included in the right-eye image from the position of the second object $B_L$ included in the left-eye image is a positive value. In this case, the second position difference value dis2 is smaller than the first position difference value dis1, and accordingly, the first object A is recognized to be closer than the second object B by the user.

A third object $C_L$ included in the left-eye image and a third object $C_R$ included in the right-eye image allow the user to recognize a third object C. Since the third object $C_L$ included in the left-eye image and the third object $C_R$ included in the right-eye image are displayed at the same position on the screen, a third position difference value dis3 of the third object $C_L$ included in the left-eye image and the third object $C_R$ included in the right-eye image is 0.

A fourth object $D_L$ included in the left-eye image and a fourth object $D_R$ included in the right-eye image allow the user to recognize a fourth object D. The fourth object $D_L$ included in the left-eye image and the fourth object $D_R$ included in the right-eye image are spaced apart from each other by a fourth position difference value dis4. Since the right direction of the screen is the positive direction, the fourth position difference value dis4 acquired by subtracting the position of the fourth object $D_R$ included in the right-eye image from the position of the fourth object $D_L$ included in the left-eye image is a negative value.

A fifth object $E_L$ included in the left-eye image and a fifth object $E_R$ included in the right-eye image allow the user to recognize a fifth object E. The fifth object $E_L$ included in the left-eye image and the fifth object $E_R$ included in the right-eye image are spaced apart from each other by a fifth position difference value dis5. Since the right direction of the screen is the positive direction, the fifth position difference value dis5 acquired by subtracting the position of the fifth object $E_R$ included in the right-eye image from the position of the fifth object $E_L$ included in the left-eye image is a negative value. In this case, the fifth position difference value dis5 is smaller than the fourth position difference value dis4, and accordingly, the fifth object E is recognized to be farther than the fourth object D by the user.

As such, when the difference value between the position of the object included in the left-eye image and the position of the object included in the right-eye image is a positive value, the object is recognized to be relatively close by the user and when the difference value is a negative value, the object is recognized to be relatively far by the user.

Power consumption of the stereoscopic display device may be saved by decreasing the luminance of a rear image of a stereoscopic image which appears relatively dimmed to a user.

When the difference value between the position of the object included in the left-eye image and the position of the object included in the right-eye image is a positive value, the luminance of the object may be maintained, and when the difference value between the position of the object included in the left-eye image and the position of the object included in the right-eye image is a negative value, the luminance of the object may be decreased, and the luminance of the image data signal DAT may be reset.

For example, when the difference value between the position of the object included in the left-eye image and the position of the object included in the right-eye image is positive, a first positive threshold value may be set. When the difference value is equal to or more than the first threshold value, the luminance of the corresponding object may be maintained, and when the difference value is between the first threshold value and 0, the luminance of the corresponding object is decreased by a first level, and the luminance of the image data signal DAT may be reset. When the difference value between the position of the object included in the left-eye image and the position of the object included in the right-eye image is 0, the luminance of the corresponding object may be decreased by a second level larger than the first level, and the luminance of the image data signal DAT may be reset.

When the difference value between the position of the object included in the left-eye image and the position of the object included in the right-eye image is negative, a second negative threshold value may be set. When the difference value is a difference value between 0 and the second threshold value, the luminance of the corresponding object may be decreased by a third level larger than the second level, and when the difference value is equal to or less than the second threshold value, the luminance of the corresponding object may be decreased by a fourth level larger than the third level, and the luminance of the image data signal DAT may be reset.

For example, as the object recognized by the user from the user increases, the luminance of the object may be gradually decreased, and the luminance of the image data signal DAT may be reset.

In the case the difference value between the position of the object included in the left-eye image and the position of the object included in the right-eye image is positive, the luminance of the corresponding object may be increased when the difference value is equal to or more than the first threshold value, and the luminance of the corresponding object may be maintained when the difference value is a value between the first threshold value and 0.

Resetting the luminance of the image data signal DAT may be performed by a luminance resetting unit 113.

Alternatively, the right-eye image may be the reference image, the left-eye image may be the search image, and a left direction of the screen may be the positive direction. In this case, the difference value between the position of the object included in the left-eye image and the position of the object included in the right-eye image may be acquired, and the luminance of the image data signal DAT may be reset in substantially the same manner as described above in connection with when the left eye image is the reference image, the right eye image is the search image, and the right direction of the screen is the positive direction.

When the left-eye image is the reference image and the right-eye image is the search image, and the left direction of the screen is the positive direction when the user views the screen or when the right-eye image is the reference image and the left-eye image is the search image, and the right direction of the screen is the positive direction when the user views the screen, the difference value between the position of the object included in the left-eye image and the position of the object included in the right-eye image may have an opposite sign of the difference value between the position of the object included in the left-eye image and the position of the object included in the right-eye image obtained when the left eye image is the reference image, the right eye image is the search image, and the right direction of the screen is the positive direction or when the right eye image is the reference image, the left eye image is the search image, and the left direction of the screen is the positive direction. By using the difference value having the opposite sign, the luminance of the image data signal DAT may be reset.

The disparity analyzing unit 111 calculates the disparity of the objects included in the left-eye image and the right-eye image by using the stereo matching technique. Alternatively, the disparity analyzing unit 111 may acquire the disparity of the objects included in the left-eye image and the right-eye image by using a disparity map. The disparity map may be acquired by known methods, such as a correlation based method, or a feature based method.

Referring back to FIG. 2, a disparity classifying unit 112 receives the disparity of the objects included in the left-eye image and the right-eye image from the disparity analyzing unit 111 and classifies an object depth in which an object is recognized by the user according to the disparity.

The disparity classifying unit 112 may classify the object depth into the front object depth, the zero object depth, and the rear object depth. The front object depth represents when the recognized object appears projected toward the user from the display unit 400, the zero object depth represents when the recognized object appears positioned on the display unit 400, and the rear object depth represents when the recognized object appears positioned at an opposite side of the user with respect to the display unit 400.

As illustrated in FIG. 4, the front object depth may be classified into a first front object depth DP1 in which the recognized object is relatively closer to the user and a second front object depth DP2 in which the recognized object is relatively closer the display unit 400. The rear object depth may be classified into the first rear object depth DP4 in which the recognized object is relatively closer to the display unit 400 and the second rear object depth DP5 in which the recognized object is relatively farther from the display unit 400. The first object A is recognized by the user within a range of the first front object depth DP1, the second object B is recognized by the user within a range of the second front object depth DP2, the third object C is recognized by the user within a range of the zero object depth DP3, the fourth object D is recognized by the user within a range of the first rear object depth DP4, and the fifth object E is recognized by the user within in a range of the second rear object depth DP5.

The luminance resetting unit 113 receives information on a object depth of the objects included in the left-eye image and the right-eye image, and resets the luminances of the left-eye image and the right-eye image by gradually decreasing the luminances of the objects as the object depth of the objects included in the left-eye image and the right-eye image i from the user increases.

As illustrated in FIG. 5, the luminance resetting unit 113 may maintain the luminance of the first object A corresponding to the first front object depth DP1 in the left-eye image and the right-eye image, make the luminance of the second object B corresponding to the second front object depth DP2 lower than the luminance of the first object A, make the luminance of the third object C corresponding to the zero object depth DP3 lower than the luminance of the second object B, make the luminance of the fourth object D corresponding to the first rear object depth DP4 than the luminance of the third object C, and make the luminance of the fifth object E corresponding to the second rear object depth DP5 than the luminance of the fourth object D. The luminance of a rear object which appears relatively dimmed by the user may be reduced, saving the power consumption of the stereoscopic display device.

Alternatively, the luminance resetting unit 113 may maintain the luminance of the second object B corresponding to the second front object depth DP2, make the luminance of the first object A corresponding to the first front object depth DP1 higher than the luminance of the second object B, make the luminance of the third object C corresponding to the zero object depth DP3 lower than the luminance of the second object B, make the luminance of the fourth object D corresponding to the first rear object depth DP4 lower than the luminance of the third object C, make the luminance of the fifth object E corresponding to the second rear object depth DP5 lower than the luminance of the fourth object D.

As such, the luminance resetting unit 113 may reset the luminance of the left-eye image and/or the right-eye image and may generate a second left-eye image signal and a second right-eye image signal. The second left-eye image signal and the second right-eye image signal with the reset luminances are output as the image data signal DAT.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A stereoscopic display device, comprising:
a display unit including a plurality of pixels;
a scan driving unit configured to sequentially apply scan signals to a plurality of scan lines connected to the plurality of pixels;
a data driving unit configured to apply gray voltages to a plurality of data lines connected to the plurality of pixels in response to the scan signals; and
a signal controlling unit configured to transfer a data control signal and an image data signal to the data driving unit,
wherein the signal controlling unit is configured to classify, in accordance with a disparity of objects respectively included in a left-eye image and a right-eye image, an object depth in which an object is recognized by a user and is configured to reset a luminance of the left-eye image or the right-eye image corresponding to the object depth to generate the image data signal corresponding to the left-eye image or the right-eye image with the reset luminance,
wherein the gray voltages correspond to the left-eye image or the right-eye image that has had its luminance reset.

2. The stereoscopic display device of claim 1, wherein the signal controlling unit is configured to gradually decrease a luminance of the recognized object as the object depth from the user increases.

3. The stereoscopic display device of claim 1, wherein the signal controlling unit is configured to classify the object depth into a front object depth in which the recognized object appears projected towards the user from the display unit, a zero object depth in which the recognized object appears positioned on the display unit, and a rear object depth in which the recognized object appears to be positioned at an opposite side of the user with respect to the display unit.

4. The stereoscopic display device of claim 3, wherein the signal controlling unit is configured to maintain a luminance of a first object corresponding to the front object depth, to make a luminance of a second object corresponding to the zero object depth lower than the luminance of the first object, and to make a luminance of a third object corresponding to the rear object depth lower than the luminance of the second object.

5. The stereoscopic display device of claim 3, wherein the front object depth includes a first front object depth in which the recognized object is relatively closer to the user side and a second front object depth in which the recognized object is relatively closer to the display unit, and the rear object depth includes a first rear object depth in which the recognized object is relatively closer to the display unit and a second rear object depth in which the recognized object is relatively farther from the display unit.

6. The stereoscopic display device of claim 5, wherein the signal controlling unit is configured to maintain the luminance of the first object corresponding to the first front object depth, to make the luminance of the second object corresponding to the second front object depth lower than the luminance of the first object, to make the luminance of the third object corresponding to the zero object depth lower than the luminance of the second object, to make a luminance of a fourth object corresponding to the first rear object depth lower than the luminance of the third object, and to make a luminance of a fifth object corresponding to the second rear object depth lower than the luminance of the fourth object.

7. The stereoscopic display device of claim 5, wherein the signal controlling unit is configured to maintain the luminance of the second object corresponding to the second front object depth, to make the luminance of the first object corresponding to the first front object depth higher than the luminance of the second object, to make the luminance of the third object corresponding to the zero object depth lower than the luminance of the second object, to make the luminance of the fourth object corresponding to the first rear object depth lower than the luminance of the third object, and to make the luminance of the fifth object corresponding to the second rear object depth lower than the luminance of the fourth object.

8. An image processing device, comprising a disparity classifying unit configured to classify, in accordance with a disparity of objects respectively included in a left-eye image and a right-eye image displayed by a display unit, an object depth in which an object is recognized by a user; and
a luminance resetting unit configured to reset a luminance of at least one of the left-eye image or the right-eye image by gradually decreasing the luminance of the recognized object as the object depth from the user increases and configured to generate an image data signal corresponding to the left-eye image or the right-eye image with the reset luminance, wherein the generated image data signal is output to a data driving unit for providing data voltages to the display unit, wherein the data voltages correspond to the left-eye image or the right-eye image that has had its luminance reset.

9. The image processing device of claim 8, wherein the disparity classifying unit is configured to classify the object depth into a front object depth in which the recognized object appears projected towards the user from the display unit, a zero object depth in which the recognized object appears positioned on the display unit, and a rear object depth in which the recognized object appears positioned at an opposite side of the user with respect to the display unit.

10. The image processing device of claim 9, wherein the front object depth includes a first front object depth in which the recognized object is relatively closer to the user side and a second front object depth in which the recognized object is relatively closer to the display unit, and the rear object depth includes a first rear object depth in which the recognized object is relatively closer to the display unit and a second rear object depth in which the recognized object is relatively farther from the display unit.

11. The image processing device of claim 10, wherein the luminance resetting unit is configured to maintain a luminance of a first object corresponding to the first front object depth, to make a luminance of a second object corresponding to the second front object depth lower than the luminance of the first object, to make a luminance of a third object corresponding to the zero object depth lower than the luminance of the second object, to make a luminance of a fourth object corresponding to the first rear object depth lower than the luminance of the third object, and to make a luminance of a fifth object corresponding to the second rear object depth lower than the luminance of the fourth object.

12. The image processing device of claim 10, wherein the luminance resetting unit is configured to maintain the luminance of the second object corresponding to the second front object depth, to make the luminance of the first object corresponding to the first front object depth higher than the luminance of the second object, to make the luminance of the third object corresponding to the zero object depth lower than the luminance of the second object, to make the luminance of the fourth object corresponding to the first rear object depth lower than the luminance of the third object, and to make the luminance of the fifth object corresponding to the second rear object depth lower than the luminance of the fourth object.

13. The image processing device of claim 8, further comprising:

a disparity analyzing unit configured to analyze the disparity of the objects respectively included in the left-eye image and the right-eye image.

14. An image processing method, comprising:

analyzing a disparity of objects respectively included in a left-eye image and a right-eye image displayed on a display unit;

classifying an object depth in which an object is recognized by a user in accordance with the disparity;

resetting a luminance of at least one of the left-eye image or the right-eye image by gradually decreasing a luminance of the recognized object as the object depth from the user increases;

generating an image data signal corresponding to the left-eye image or the right-eye image with the reset luminance; and outputting the generated image data signal to a data driving unit for providing data voltages to the display unit, wherein the data voltages correspond to the left-eye image or the right-eye image that has had its luminance reset.

15. The image processing method of claim 14, further comprising:

classifying the object depth into a front object depth in which the recognized object appears projected towards the user side from the display unit, a zero object depth in which the recognized object appears positioned on the display unit, and a rear object depth in which the recognized object appears positioned at an opposite side of the user with respect to the display unit.

16. The image processing method of claim 15, further comprising:

classifying the front object depth into a first front object depth in which the recognized object is relatively closer to the user side and a second front object depth in which the recognized object is relatively closer to the display unit; and classifying the rear object depth into a first rear object depth in which the recognized object is relatively closer to the display unit and a second rear object depth in which the recognized object is relatively farther from the display unit.

17. The image processing method of claim 16, wherein resetting the luminance of the at least one of the left-eye image or the right-eye image comprises:

maintaining a luminance of a first object corresponding to the first front object depth;

making a luminance of a second object corresponding to the second front object depth lower than the luminance of the first object, making a luminance of a third object corresponding to the zero object depth lower than the luminance of the second object, making a luminance of a fourth object corresponding to the first rear object depth lower than the luminance of the third object, and making a luminance of a fifth object corresponding to the second rear object depth lower than the luminance of the fourth object.

18. The image processing method of claim 16, wherein resetting the luminance of the at least one of the left-eye image or the right-eye image comprises:

maintaining a luminance of a second object corresponding to the second front object depth;

making a luminance of a first object corresponding to the first front object depth higher than the luminance of the second object, making a luminance of a third object corresponding to the zero object depth lower than the luminance of the second object, making a luminance of a fourth object corresponding to the first rear object depth lower than the luminance of the third object, and making a luminance of a fifth object corresponding to the second rear object depth lower than the luminance of the fourth object.

19. An image processing method, comprising:

acquiring a difference value between a position of an object included in a left-eye image and a position of an object included in a right-eye image;

maintaining a luminance of an object recognized by a user when the difference value is a positive value;

decreasing the luminance of the recognized object when the difference value is a negative value;

generating an image data signal corresponding to the recognized object with the decreased luminance; and outputting the generated image data signal to a data driving unit for providing data voltages to a display unit, wherein the data voltages correspond to the left-eye image or the right-eye image that has had its luminance reset.

20. The image processing method of claim 19, wherein maintaining the luminance of the recognized object when the difference value is the positive value comprises:

maintaining the luminance of the recognized object when the difference value is equal to or more than a first positive threshold value; and decreasing the luminance of the recognized object by a first level when the difference value is a value between the first threshold value and 0.

21. The image processing method of claim 20, wherein the luminance of the recognized object is decreased by a second level more than the first level when the difference value is 0.

22. The image processing method of claim 21, wherein decreasing the luminance of the recognized object when the difference value is the negative value comprises:

decreasing the luminance of the recognized object by a third level more than the second level when the difference value is a value between 0 and a second negative threshold value; and decreasing the luminance of the recognized object by a fourth level more than the third level when the difference value is equal to or less than the second threshold value.

23. The image processing method of claim 19, wherein maintaining the luminance of the recognized object when the difference value is the positive value comprises:

maintaining the luminance of the recognized object when the difference value is a value between a first threshold value and 0, and increasing the luminance of the recognized object when the difference value is equal to or more than the first positive threshold value.

24. A display device, comprising:

a display unit configured to display a left-eye image and a right-eye image, the display unit including a plurality of pixels;

a data driving unit configured to apply gray voltages through a plurality of data lines to the plurality of pixels in response to an image data signal; and a signal controlling unit configured to determine an object depth in which an object is recognized by a user in accordance with a disparity of objects respectively included in a left-eye image and a right-eye image, to reset a luminance of the left-eye image or the right-eye image according to the determined object depth, and to generate the image data signal corresponding to the left-eye image or the right-eye image with the reset luminance, so that a luminance of the recognized object is reduced as the object depth increases, wherein the gray voltages correspond to the left-eye image or the right-eye image that has had its luminance reset.

* * * * *